United States Patent
Jeon et al.

(10) Patent No.: US 8,902,615 B2
(45) Date of Patent: Dec. 2, 2014

(54) LOAD-SEGMENTATION-BASED 3-LEVEL INVERTER AND METHOD OF CONTROLLING THE SAME

(75) Inventors: Seongjeub Jeon, Busan (KR); Dongho Cho, Seoul (KR); Chuntaek Rim, Daejeon (KR); Guho Jeong, Seoul (KR)

(73) Assignees: Pukyong National University Industry-University Cooperation Foundation, Busan (KR); Korea Advanced Institute of Science and Technology, Daejeon (KR)

( * ) Notice: Subject to any disclaimer, the term of this patent is extended or adjusted under 35 U.S.C. 154(b) by 341 days.

(21) Appl. No.: 13/518,636

(22) PCT Filed: Dec. 23, 2009

(86) PCT No.: PCT/KR2009/007696
§ 371 (c)(1),
(2), (4) Date: Sep. 12, 2012

(87) PCT Pub. No.: WO2011/078425
PCT Pub. Date: Jun. 30, 2011

(65) Prior Publication Data
US 2012/0326506 A1    Dec. 27, 2012

(51) Int. Cl.
*H02M 7/487* (2007.01)
*H02J 3/14* (2006.01)

(52) U.S. Cl.
CPC . *H02M 7/487* (2013.01); *H02J 3/14* (2013.01)
USPC .................................. 363/43; 307/12

(58) Field of Classification Search
CPC ............................. H02M 7/487; H02M 7/83
USPC .............................................. 363/43; 307/12
See application file for complete search history.

(56) References Cited

U.S. PATENT DOCUMENTS

| 5,781,418 A | 7/1998 | Chang et al. |
| 7,173,467 B2 | 2/2007 | Liu |
| 2013/0119762 A1* | 5/2013 | Jeon et al. ............... 307/38 |

FOREIGN PATENT DOCUMENTS

JP          2005137045 A  *  5/2005

OTHER PUBLICATIONS

Francisco Canales et al., "A Zero Voltage Switching Three-Level DC/DC Converter" 2000 IEEE, pp. 512-517, Sep. 2000.
Jose Rodriguez et al., "Multilevel Inverters: A Survey of Topologies, Controls, and Applications" 2002 IEEE, vol. 49, pp. 724-738, Aug. 2002.
International Search Report for PCT/KR2009/007696, mailed Sep. 17, 2010; ISA/KR, 2 pages.

* cited by examiner

*Primary Examiner* — Harry Behm
(74) *Attorney, Agent, or Firm* — Harness, Dickey & Pierce, P.L.C.

(57) ABSTRACT

The present disclosure relates to a load-segmentation-based 3-level inverter and method for controlling same. Three-level inverter includes: multiple capacitors charged with voltages divided from a DC input voltage; top switch having one end connected with positive terminal of one of multiple capacitors; bottom switch having one end connected with negative terminal of one of multiple capacitors; multiple legs each including a first switch connected to the other end of top switch and a second switch connected to the other end of bottom switch with the first and second switches connected; multiple diodes connected in series forwardly from the other end of bottom switch to the other end of top switch and having interconnect points connected to a contact between the multiple capacitors; and multiple loads having connected terminals at a contact between the first and second switches of each of the legs and a contact between the multiple diodes.

16 Claims, 4 Drawing Sheets

LOAD-SEGMENTATION-BASED 3-LEVEL INVERTER AND METHOD OF CONTROLLING THE SAME

CROSS-REFERENCE TO RELATED APPLICATIONS

This application is a 371 U.S. National Stage of International Application No. PCT/KR2009/007696, filed on Dec. 23, 2009. The disclosure of which is herein incorporated by reference in its entirety.

TECHNICAL FIELD

The present disclosure relates to a 3-level inverter and a method for controlling the same. More particularly, the present disclosure relates to a 3-level inverter and a method for controlling the same in supplying DC/AC converted voltage selectively to a plurality of loads with minimal number of semiconductor switch elements to reduce cost while preventing load current from decreasing.

BACKGROUND

The statements in this section merely provide background information related to the present disclosure and may not constitute prior art.

As a means for converting DC to AC, early inverters by the names of thyratron and mercury rectifier have been replaced mostly by thyrister except for heavy-duty high-voltage circuits used in DC electric transmission, for example.

In general, inverters may be classified into a single-phase inverter and a three-phase inverter. The single-phase inverter can supply AC power to a single-phase load. By the way, electrical equipments such as online electric vehicles employ a plurality of loads which should be supplied with the AC power. The installment of a single-phase inverter per each load exacts high cost.

Therefore, to meet the need for selective supply of current to multiple loads, the generally preferred method has been installing switches such as bi-directional semiconductor switch corresponding to the respective loads and controlling the switches on and off to supply current as needed to the appropriate loads, as shown in FIG. 1.

However, the switch is constructed for switching in both directions as enlarged in the circle of FIG. 1 with exemplary four loads requiring the total of twelve semiconductor switch elements for the 3-level inverter. Such increase of the number of semiconductor switch elements results in a load current reduction as well as a higher cost of the 3-level inverter.

DISCLOSURE

Technical Problem

The present disclosure is directed to a 3-level inverter and a method for controlling the same, wherein multiple segments of an equipment to power sequentially through an inverter are supplied with electrical power with a reduction of dedicated switches to select the segments by simply controlling on/off operation of semiconductor switches leaving minimal number of the semiconductor switch elements to cut the cost of equipment and allow the load current to flow through less devices and thus improve the inverter efficiency.

SUMMARY

An aspect of the present disclosure provides a three-level inverter including: a plurality of capacitors charged with voltages divided from a DC (direct current) input voltage; a top switch having one end connected with a positive terminal of one of the plurality of capacitors; a bottom switch having one end connected with a negative terminal of one of the plurality of capacitors; a plurality of legs, each leg including a first switch connected to the other end of the top switch and a second switch connected to the other end of the bottom switch with the first switch and the second switch connected; a plurality of diodes connected in series in a forward direction from the other end of the bottom switch to the other end of the top switch and having interconnect points connected to a contact between the plurality of capacitors; and a plurality of loads having connected terminals at a contact between the first switch and the second switch of each of the legs and a contact between the plurality of diodes.

Here, each of the first switch, second switch, top switch and bottom switch may be configured with a transistor and a diode connected in parallel to each other.

In addition, the aforementioned three-level inverter may further include an auxiliary capacitor having opposite ends connected to the other end of the top switch and the other end of the bottom switch, respectively.

In addition, the aforementioned three-level inverter may further include a control unit for performing on/off controls over the first switch, second switch, top switch and bottom switch, respectively.

Here, the control unit may control the second switch turned off while the first switch is maintained in turn-on state.

In addition, the control unit may control the first switch turned off while the second switch is maintained in turn-on state.

In addition, control unit may control the bottom switch turned off while the top switch is maintained in turn-on state, and control the top switch turned off while the bottom switch is maintained in turn-on state.

In addition, when the control unit controls the top switch to be turned on, the control unit may control the first switch to be turned on with a predetermined time of delay, and when the control unit controls the bottom switch to be turned on, the control unit may control the second switch with a certain delay.

Additionally, the plurality of capacitors may be implemented to have an equal capacitance.

To achieve the foregoing objectives in accordance with one or more embodiments of the present disclosure, there is provided a method of controlling a three-level inverter which includes the following. A plurality of capacitors charged with voltages divided from a DC input voltage, a top switch having one end connected with a positive terminal of one of the plurality of capacitors, a bottom switch having one end connected with a negative terminal of one of the plurality of capacitors, first switches respectively connected to the other end of the top switch and second switches respectively connected to the other end of the bottom switch. The three-level inverter is also provided with a plurality of legs each configured with one of the first switches and one of the second switches connected, an auxiliary capacitor having opposite ends connected respectively to the other end of the top switch and the other end of the bottom switch, a plurality of diodes connected in series in a forward direction from the other end of the bottom switch to the other end of the top switch and having interconnect points connected to a contact between the plurality of capacitors, and a plurality of loads having connected terminals at contacts between the first switches and the second switches of the legs and a contact between the plurality of diodes with the respective legs having the first and second switches connected in series. This method includes the processes of: turning on the top switch or the bottom switch; responsive if the top switch is turned on, selecting one or more of the first switches; and turning on selected one or more of the first switches with a predetermined time of delay.

The three-level inverter control method may further include: turning off the top switch having been turned on, and turning on the bottom switch.

In addition, the three-level inverter control method may include: while the top switch is maintained in turn-on state, maintaining the bottom switch turned off, and while the first switches are maintained in turn-on state, maintaining the second switches turned off.

The three-level inverter control method may further include: turning off the first switches having been turned on, and turning on the second switches pairing with the selected one or more of the first switches.

Further, the three-level inverter control method may include: turning off the bottom switch, and turning on the top switch.

Advantageous Effects

According to an embodiment of the present disclosure, in the event where multiple segments are powered sequentially through an inverter, the segments are selected simply by controlling the on/off operation of the semiconductor switches without requiring a switch for the segment selection, to thereby employ a minimum number of semiconductor switch elements, reduce the cost and cut the number of switches that flows large current and thus improve the inverter efficiency.

DETAILED DESCRIPTION

Figure 1:
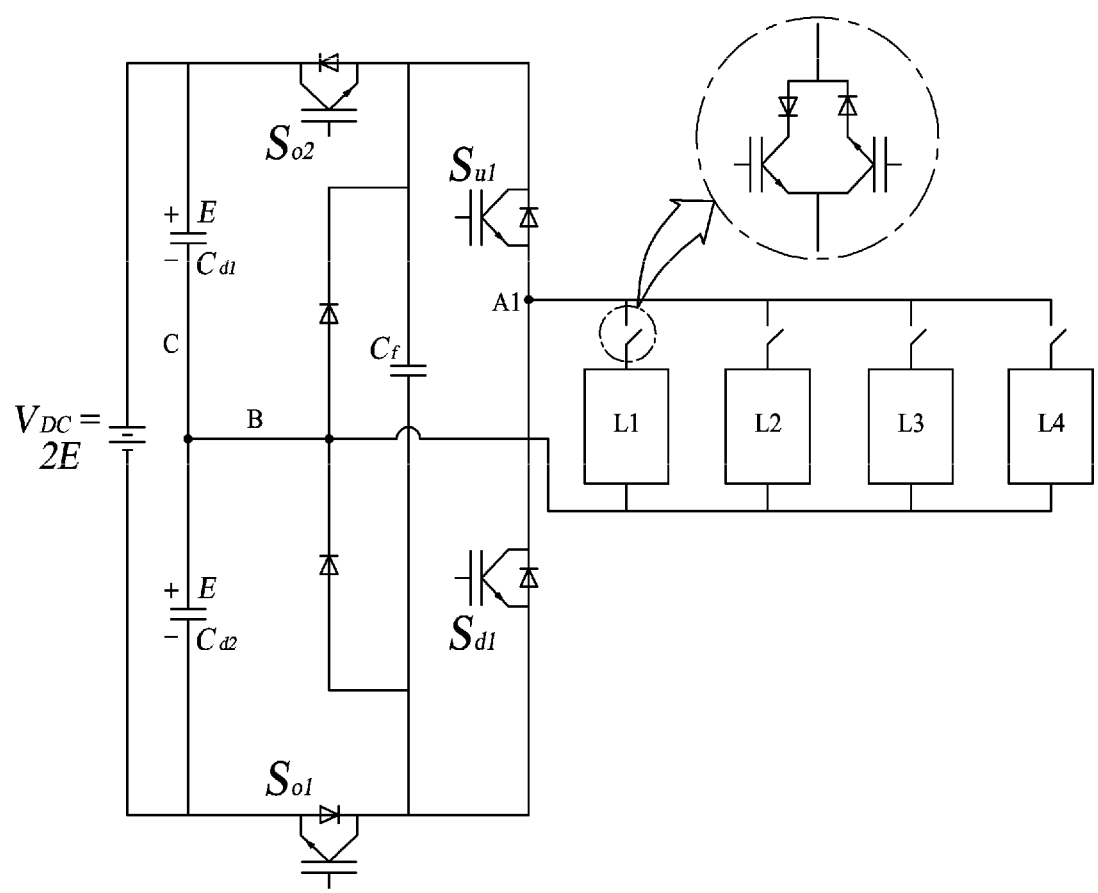
FIG. 1 is a diagram for illustrating an exemplary 3-level inverter for loads formed of a number of segments.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 2:
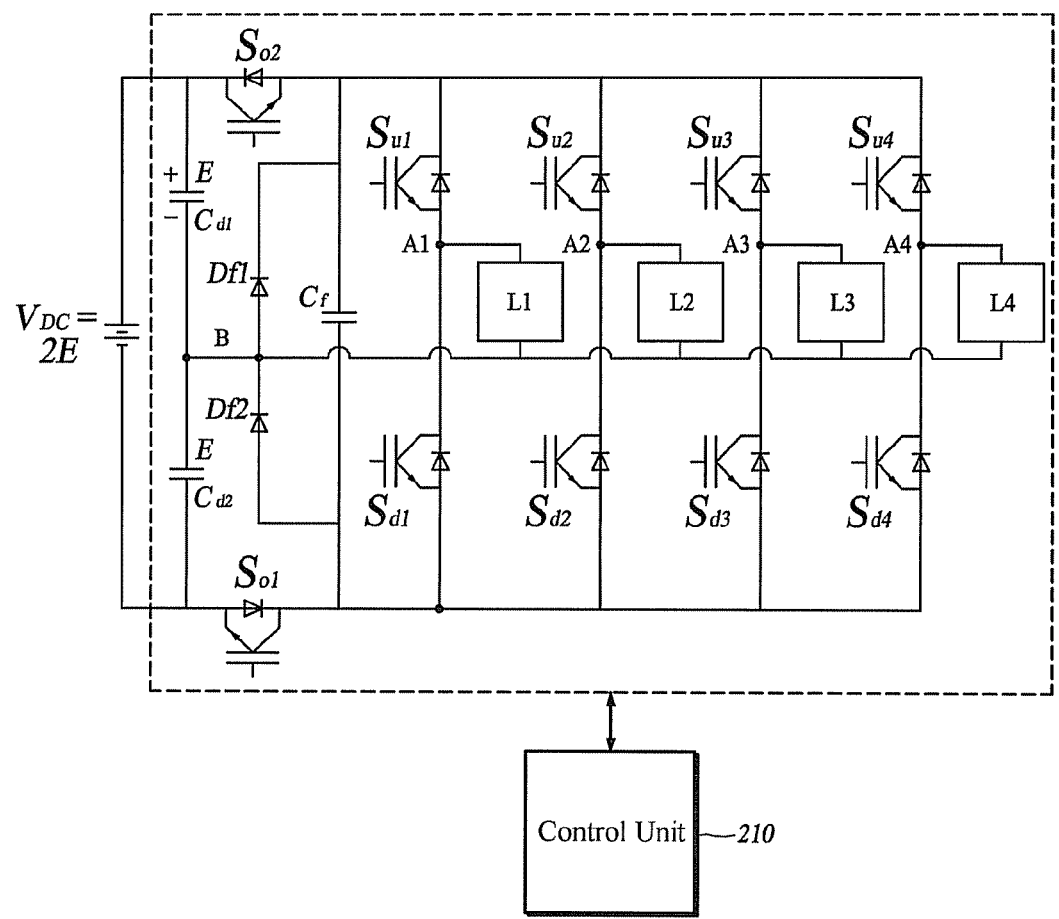
FIG. 2 is a diagram for illustrating a 3-level inverter according to one or more embodiments of the present disclosure.

FIG. 2 shows a 3-level inverter according to one or more embodiments of the present disclosure. As illustrated, the 3-level inverter according to one exemplary embodiment includes a couple of capacitors Cd1 and Cd2 for dividing the DC input voltage; a top switch So2 having one end connected to the positive terminal of capacitor Cd1; a bottom switch So1 having one end connected to the negative terminal of capacitor Cd2; first switches Su1, Su2, Su3, Su4 respectively connected to the other end of top switch So2, and second switches Su1, Su2, Su3, Su4 respectively connected to the other end of bottom switch So1. Additionally included in the 3-level inverter are a plurality of legs formed by pairing the first switches Su1, Su2, Su3, Su4 with the second switches Su1, Su2, Su3, Su4 respectively; multiple diodes which are connected in the forward direction from the other end of the bottom switch So1 to the other end of the top switch So2 and have interconnect points also connected with a contact between the multiple capacitors Cd1, Cd2; and a plurality of loads L1, L2, L3, L4 having their connected terminals at contacts A1, A2, A3, A4 in between the first/second switch pairs Su1/Sd1, Su2/Sd2, Su3/Sd3, Su4/Sd4 on one hand and at the other contact B in between the multiple capacitors Cd1, Cd2 on the other hand. Here, the 3-level inverter may further include an auxiliary capacitor Cf having opposite terminals connected respectively to the other end of the bottom switch So1 and the other end of the top switch So2.

In addition, the top switch So2, bottom switch So1, first switches Su1, Su2, Su3, Su4 and second switches Sd1, Sd2, Sd3, Sd4 may be respectively configured with transistors and diodes connected in parallel. Alternatively, the top switch So2, bottom switch So1, first switches Su1, Su2, Su3, Su4 and second switches Sd1, Sd2, Sd3, Sd4 may be implemented respectively by transistors, diodes and capacitors connected in parallel.

In addition, the multiple capacitors Cd1, Cd2 may well be implemented to have an equal capacitance.

Here, the connected pair of the first switch Su1 and second switch Sd1 is named as leg 1, the first switch Su2 and the second switch Sd2 connected in pair are called leg 2. In addition, leg 3 is the name of the first switch Su3 paired with the second switch Sd3, and leg 4 is named for the pair of the first switch Su4 and the second switch Sd4.

In particular, the first switch Su1 and second switch Sd1 have the interconnect contact labeled A1, the first and second switches Su2, Sd2 have the contact A2, the first and second switches Su3, Sd3 have the contact A3, and the first and second switches Su4, Sd4 have the contact A4. In addition, the multiple diodes connected in series have the junction of B.

In addition, segment 1 collectively refers to the first, second switches Su1, Sd1 and the load L1 connected between the contacts A1 and B. Segment 2 collectively refers to the first, second switches Su2, Sd2 and the load L1 connected between the contacts A2 and B. Next, segment 3 collectively refers to the first, second switches Su3, Sd3 and the load L3 connected between the contacts A3 and B. In addition, segment 4 collectively refers to the first, second switches Su4, Sd4 and the load L4 connected between the contacts A4 and B. Here, the 3-level inverter is illustrated with four legs installed, but the legs are not limited to this number.

Meanwhile, the 3-level inverter may further include a control unit 210 for carrying out the on/off control over the top switch So2, bottom switch So1, the first switches Su1, Su2, Su3, Su4 and the second switches Sd1, Sd2, Sd3, Sd4, respectively.

Figure 3:
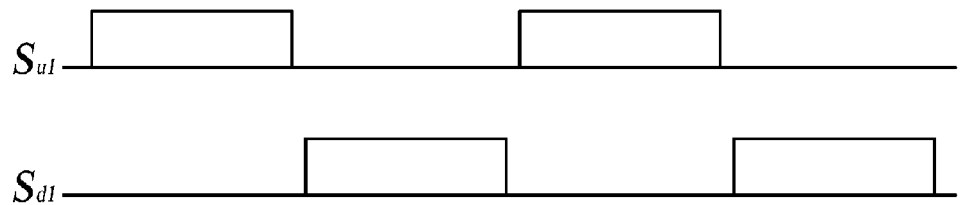
FIG. 3 is a diagram for illustrating an example of a control over a switch that makes up each leg.

Here, while the control unit 210 has at least one of the first switches Su1, Su2, Su3, Su4 in the respective legs turned on, it should maintain the turn-off state of the second switches which are connected to the turned on first switch within the same leg. For example, as illustrated in FIG. 3, while the first switch Su1 stays turned on, the control unit 210 should keep the second switch Sd1 turned off.

Additionally, while the control unit 210 has at least one of the second switches Sd1, Sd2, Sd3, Sd4 in the respective legs turned on, it controls the first switches in the same legs to stay turned on. For example, as illustrated in FIG. 3, when the second switch Sd1 stays turned on, the control unit 210 should keep the first switch Su1 turned off.

In addition, the control unit 210 may operate, in response to the turn-on of the top switch So2, for controlling the bottom switch So1 to stay turned off, and conversely, in response to turning on the bottom switch So1, for controlling the top switch So2 to stay turned off.

Moreover, in response to the turn-on of the top switch So2, the control unit 210 may control at least one of the first switches (Su1, Su2, Su3, and Su4) to turn on with a predetermined time of delay.

Figure 4:
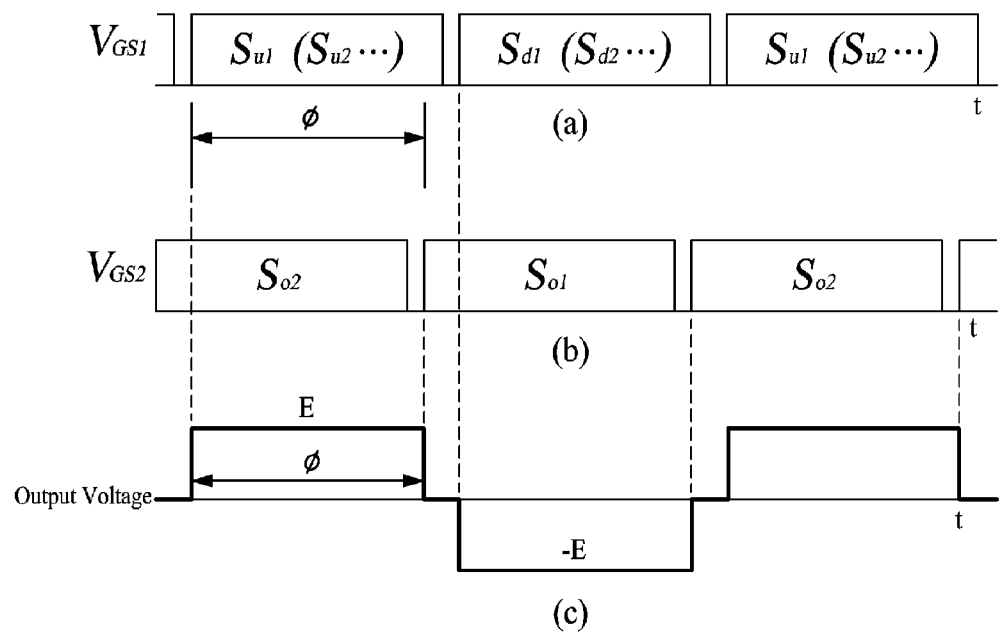
FIG. 4 is a diagram for illustrating exemplary output voltages applied to the loads, respectively.

FIG. 4 illustrates waveforms of output voltages from an arbitrary segment under the switch control of the control unit 4. Regarding segment 1, the output voltages are shown as applied to load 1 upon on/off controlling the top switch So2, bottom switch So1, first switch Su1 and second switch Sd1.

Referring to FIGS. 2 and 4, the control unit 210, in response to turn-on of the top switch So2, may control to turn on the first switch Su1 connected with the load (L1 from L1, L2, L3, and L4) at contact A1 at a delayed time from the top switch So2 to turn on. At this time, in response to the turn-on of the top switch So2, the bottom switch So1 stays turned off, and in response to turn-on of the first switch Su1, the second switch Sd1 of the leg 1 stays turned off. Although the description herein refers to turn-on of the first switch Su1 later than the top switch So2 by the predetermined delay, the control unit 210 is occasionally operative in response to turn-on of the first switch Su1 connected with the load L1 at contact A1, to turn on the first switch Su1 a predetermined time earlier than the top switch So2.

The length of turn-on time of the respective first switches Su1, Su2, Su3, Su4 may be set equal to that of the respective second switches Sd1, Sd2, Sd3, Sd4, and Sd5. The turn-on time of the top switch So2 is set to be equal to that of the bottom switch So1. In addition, all the turn-on times of the top switch So2, bottom switch So1, the respective first switches Su1, Su2, Su3, Su4 and the respective second switches Sd1, Sd2, Sd3, Sd4, Sd5 may be made equal.

The on/off operations of the top switch So2, bottom switch So1 as well as the first, second switches Su1, Sd1 of the leg 1 provide the output voltages in the waveforms as illustrated in the drawing.

Figure 5:
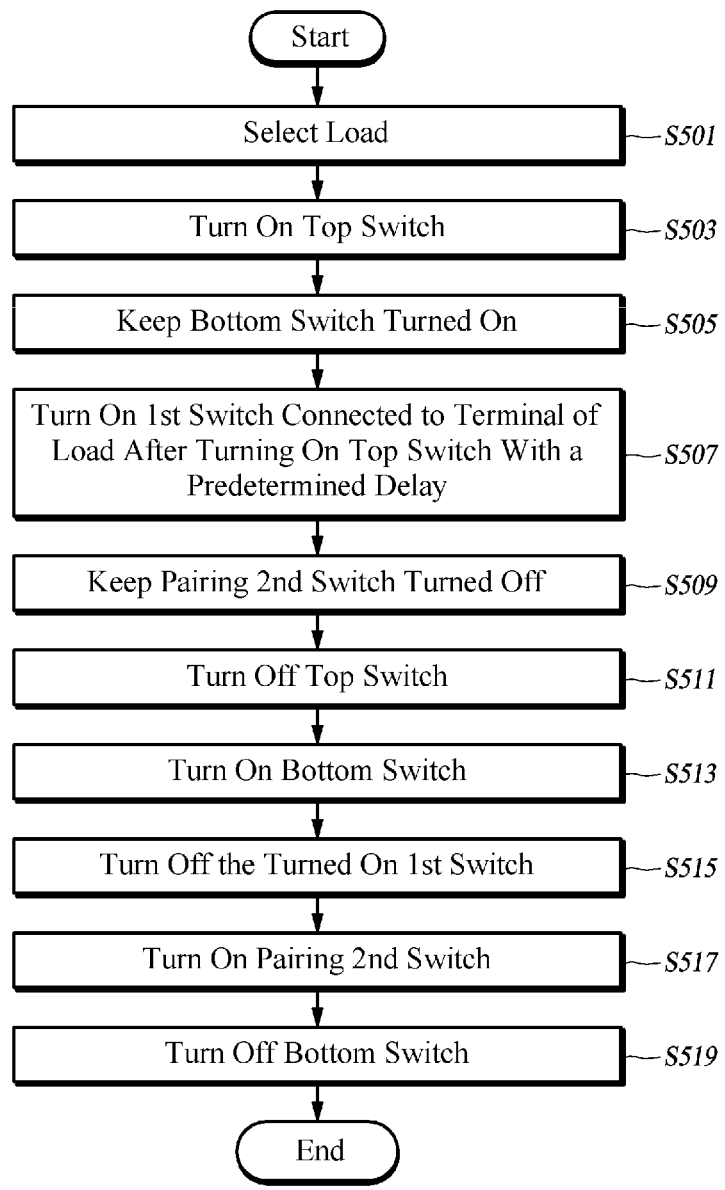
FIG. 5 is a flow chart illustrating a method for controlling a 3-level inverter in accordance with one or more embodiments of the present disclosure.

FIG. 5 is a flow chart illustrating a method of control of a 3-level inverter according to an embodiment of the present disclosure. Referring to FIGS. 2, 4 and 5, the 3-level inverter control will now be described in detail.

Referring to the drawings, the multiple capacitors Cd1, Cd2 are charged with the DC divider input voltage. Then, the capacitors Cd1 and Cd2 may be implemented to have the common capacitance. In this case, if the DC input voltage is 2E, voltage E is applied to the capacitors Cd1 and Cd2, respectively.

The control unit 210 first turns on the top switch So2 or the bottom switch So1 (at step S501). FIG. 4 exemplifies the case that the top switch So2 is initially turned on. At this time, the control unit 210 operates, in response to the turn-on of the top switch So2, to maintain the turn-off state of the bottom switch So1 (S503). In addition, all the switches Su1, Su2, Su3, Su4, Sd1, Sd2, Sd3, Sd4 that make up the segments are assumed to be at a turn-off state. Therefore, no current flows into the loads L1, L2, L3, and L4.

Next, the control unit 210 makes a selection among the plurality of loads L1, L2, L3, and L4 for supplying current to. Here, the first load L1 is assumed to be selected.

With the load L1 selected for supplying current to, the control unit 210 then selects the first switch Su1 of the leg 1 corresponding to the selected load L1 (S505) and turns on the selected first switch Su1 at a predetermined delayed time from the turn-on of the top switch So2 (S507). At this point, the second switch Sd2, which is paired with the turned-on first switch Su1 of the leg 1, maintains its turn-off state (S509).

Turn-on of the first switch Su1 of the leg 1 allows the current generated by the capacitor Cd1 to flow through the top switch So2, first switch Su1 and load L1, and the voltage of the capacitor Cd1 is applied to the load L1. The waveform of the voltage applied to the load L1 is as illustrated. At this time, if the 3-level inverter is provided with the auxiliary capacitor Cf, the load L1 receives the application of the voltage from the capacitor Cd1 as the auxiliary capacitor Cf is charged by the voltage of the capacitor Cd1.

Next, as the control unit 210 turns off the top switch So2 and turns on the bottom switch So1, turning the top switch So2 off (S511) lets the current flowing along the load L1 to charge a stray capacitance existing across the top switch So2 and to discharge another stray capacitance existing across the bottom switch So1, whereby the discharge current flows through the auxiliary capacitor Cf. When these stray capacitances are charged and discharged by the voltage E, load current flows through Df1 and the voltage between contacts B and A1 is 0. At this point, voltage across the bottom switch So1 arrives at 0, at which a turn-on signal is applied (S513). At this point, turning the bottom switch So1 on still causes no voltage to be applied across the bottom switch So1 having no current to flow therethrough.

When the first switch Su1 is turned off (S515), the stray capacitance across the first switch Su1 is charged by the current on the load L1, leaving the stray capacitance across the second switch Sd1 to be discharged. When these stray capacitances undergo charging and discharging by the voltage E, a load current comes to flow toward each of the antiparallel diodes of the bottom switch So1 and second switch Sd1, and voltage −E is applied to the load L1. At this time, a turn-on signal is applied to the second switch Sd1 of leg 1 (S517). After that, depending on load conditions, the load current with changing directions flows through the bottom switch So1 and second switch Sd1. Turning off the bottom switch So1 causes the similar operation as that of the top switch So2.

In this manner, the control unit 210 can convert the DC voltage into AC voltage for subsequent application to the load upon selection and by on/off control of the switch of the corresponding segment. The load selection can be made solely by controlling the corresponding segment switch on/off, which obviates the need for extra switches. Therefore, the additional eight semiconductor elements make up the total ten of those for supplying current to every four load, achieving the reduction of semiconductor elements compared to conventional technologies. In particular, according to an embodiment of the present disclosure, the current is supplied to the load through just two semiconductor elements to thereby reduce loss due to semiconductor.

The instant illustration is for the event where a 3-level inverter has the auxiliary capacitor Cf, though the same capacitor may be omitted to achieve the aforementioned advantage.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. The computer readable media may include magnetic recording media, optical recording media, and carrier wave media.

In addition, terms like 'include', 'comprise', and 'have' should be interpreted in default as inclusive or open rather than exclusive or closed unless expressly defined to the contrary.

All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, the exemplary embodiments of the present disclosure have not been described for limiting purposes. Accordingly, the scope of the disclosure is not to be limited by the above aspects but by the claims and the equivalents thereof.

The invention claimed is:

1. A three-level inverter comprising:
   a plurality of capacitors charged with voltages divided from a DC input voltage;
   a top switch having one end connected with a positive terminal of one of the plurality of capacitors;
   a bottom switch having one end connected with a negative terminal of one of the plurality of capacitors;
   a plurality of legs, each leg including a first switch connected to the other end of the top switch and a second switch connected to the other end of the bottom switch with the first and the second switch connected in series;
   a plurality of diodes connected in series in a forward direction from the other end of the bottom switch to the other end of the top switch and having interconnect points connected to a contact between the plurality of capacitors; and
   a plurality of loads having connected terminals at a contact between the first switch and the second switch of each of the legs and a contact between the plurality of diodes.

2. The three-level inverter of claim 1, further comprising an auxiliary capacitor having opposite ends connected to the other end of the top switch and the other end of the bottom switch, respectively.

3. The three-level inverter of claim 1, further comprising a control unit for performing on/off controls over the first switch, the second switch, the top switch and the bottom switch, respectively.

4. The three-level inverter of claim 3, wherein the control unit controls the second switch turned off while the first switch is maintained in turn-on state.

5. The three-level inverter of claim 3, wherein the control unit controls the first switch turned off while the second switch is maintained in turn-on state.

6. The three-level inverter of claim 3, wherein the control unit controls the bottom switch turned off while the top switch is maintained in turn-on state.

7. The three-level inverter of claim 3, wherein the control unit controls the top switch turned off while the bottom switch is maintained in turn-on state.

8. The three-level inverter of claim 3, when the control unit controls the top switch to be turned on, the control unit controls the first switch to be turned on with a predetermined time of delay.

9. The three-level inverter of claim 3, when the control unit controls the bottom switch to be turned on, the control unit controls the second switch to be turned on with a predetermined time of delay.

10. The three-level inverter of claim 3, wherein the plurality of capacitors have an equal capacitance.

11. The three-level inverter of claim 3, wherein each of the first switch, the second switch, the top switch and the bottom switch is configured with a transistor and a diode connected in parallel to each other.

12. A method for controlling a three-level inverter including a plurality of capacitors charged with voltages divided from a DC input voltage, a top switch having one end connected with a positive terminal of one of the plurality of capacitors, a bottom switch having one end connected with a negative terminal of one of the plurality of capacitors, first switches respectively connected to the other end of the top switch and second switches respectively connected to the other end of the bottom switch, a plurality of legs each leg being configured with one of the first switches and one of the second switches connected in series, an auxiliary capacitor having opposite ends connected respectively to the other end of the top switch and the other end of the bottom switch, a plurality of diodes connected in series in a forward direction from the other end of the bottom switch to the other end of the top switch and having interconnect points connected to a contact between the plurality of capacitors, and a plurality of loads having connected terminals at contacts between the first switches and the second switches of the legs and a contact between the plurality of diodes, the method comprising:
   turning on the top switch or the bottom switch;
   responsive if the top switch is turned on, selecting one or more of the first switches; and
   turning on selected one or more of the first switches with a predetermined time of delay.

13. The method of claim 12, further comprising:
   turning off the top switch having been turned on; and
   turning on the bottom switch.

14. The method of claim 12, further comprising:
   while the top switch is maintained in turn-on state, maintaining the bottom switch turned off; and
   while the first switches are maintained in turn-on state, maintaining the second switches turned off.

15. The method of claim 13, further comprising:
   turning off the first switches having been turned on; and
   turning on the second switches pairing with the selected one or more of the first switches.

16. The method of claim 15, further comprising:
   turning off the bottom switch; and
   turning on the top switch.

* * * * *